United States Patent
Sugai

(10) Patent No.: US 12,039,208 B2
(45) Date of Patent: Jul. 16, 2024

(54) PRINTING SYSTEM ALLOWING ADMINISTRATOR TO CONVENIENTLY LIMIT FUNCTION OF PRINT DEVICE WHEN USED BY GENERAL USER, INFORMATION PROCESSING APPARATUS, CONTROL METHOD, AND STORAGE MEDIUM

(71) Applicant: CANON KABUSHIKI KAISHA, Tokyo (JP)

(72) Inventor: Yousuke Sugai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/507,433

(22) Filed: Nov. 13, 2023

(65) Prior Publication Data
US 2024/0160390 A1 May 16, 2024

(30) Foreign Application Priority Data
Nov. 15, 2022 (JP) .................... 2022-182770

(51) Int. Cl.
*G06F 3/12* (2006.01)
*H04N 1/00* (2006.01)

(52) U.S. Cl.
CPC .......... *G06F 3/1205* (2013.01); *G06F 3/1228* (2013.01); *G06F 3/1239* (2013.01);
(Continued)

(58) Field of Classification Search
CPC .... G06F 3/1205; G06F 3/1218; G06F 3/1219; G06F 3/1221; G06F 3/1228; G06F 3/129;
(Continued)

(56) References Cited

U.S. PATENT DOCUMENTS 8,189,225 B1* 5/2012 Lo ..................... G06F 3/1292
358/1.15
9,262,105 B2* 2/2016 Nakata ................ G06F 3/1285
(Continued)

FOREIGN PATENT DOCUMENTS

JP 2020004158 A 1/2020

*Primary Examiner* — Scott A Rogers
(74) *Attorney, Agent, or Firm* — ROSSI, KIMMS & McDOWELL LLP

(57) ABSTRACT

A printing system allowing an administrator to conveniently limit a function of a print device when used by a general user is provided. The printing system includes a print device, an information processing apparatus in which a general-purpose printer driver commonly usable for a plurality of models of print devices is initially set as a cloud printer driver used when printing is performed by the print device, a first server, and a second server. The printing system increases or decreases the number of functions settable by a general user by using the cloud printer driver. The first server manages an APPID of the print setting extension application to be installed when the general user uses the print device as print setting extension application designation information in association with a GUID of the print device. The second server manages a plurality of print setting extension applications in association with their APPIDs.

10 Claims, 12 Drawing Sheets

(52) U.S. Cl.
CPC ....... *H04N 1/00244* (2013.01); *H04N 1/0048* (2013.01); *H04N 1/00514* (2013.01); *H04N 1/00938* (2013.01); *H04N 1/0097* (2013.01); *G06F 3/1218* (2013.01); *G06F 3/1229* (2013.01); *G06F 3/1253* (2013.01); *G06F 3/1285* (2013.01); *H04N 1/00854* (2013.01); *H04N 1/00954* (2013.01)

(58) Field of Classification Search
CPC .... G06F 3/1285; G06F 3/1286; G06F 3/1287; H04N 1/00244; H04N 1/00344; H04N 1/00514; H04N 1/00954
See application file for complete search history.

(56) References Cited

U.S. PATENT DOCUMENTS

| | | | | |
|---|---|---|---|---|
| 9,280,309 | B2 * | 3/2016 | Uchida | G06F 3/1238 |
| 11,487,483 | B2 * | 11/2022 | Saigusa | G06F 3/1204 |
| 11,537,339 | B2 * | 12/2022 | Kakio | G06F 3/1238 |
| 11,625,205 | B2 * | 4/2023 | Kikuchi | G06F 3/1205 |
| | | | | 358/1.15 |
| 11,789,676 | B2 | 10/2023 | Saigusa | |
| 2022/0334786 | A1 * | 10/2022 | Saito | G06F 3/1288 |
| 2023/0078388 | A1 * | 3/2023 | Hidaka | G06F 3/123 |
| | | | | 358/1.15 |
| 2024/0080396 | A1 * | 3/2024 | Shimada | H04N 1/00482 |

\* cited by examiner

*FIG. 3*

| TENANT ID | ROLE | ACCOUNT ID | PASSWORD |
|---|---|---|---|
| AAAAAAA | ADMINISTRATOR | tanaka@○○.co.jp | ****** |
| AAAAAAA | GENERAL USER | suzuki@○○.co.jp | ****** |

*FIG. 6*

```
<PrintDeviceCapabilities>                                           352
  <psk:PageMediaSize psf2:psftype="Feature">
    <psk:A4 psf2:psftype="Option">
      <psk:MediaSizeHeight>297000</psk:MediaSizeHeight>
      <psk:MediaSizeWidth>210000</psk:MediaSizeWidth>
    </psk:A4>
    <psk:B5 psf2:psftype="Option">
      <psk:MediaSizeHeight>297000</psk:MediaSizeHeight>
      <psk:MediaSizeWidth>210000</psk:MediaSizeWidth>
    </psk:B5>
  </psk:PageMediaSize>[

<psk:PageOutputColor psf2:psftype="Feature">
    <psk:Color psf2:psftype="Option" psf2:default="true">
      <psk:DeviceBitsPerPixel>24</psk:DeviceBitsPerPixel>
      <psk:DriverBitsPerPixel>24</psk:DriverBitsPerPixel>
    </psk:Color>
    <psk:Gray psf2:psftype="Option" psf2:default="true">
      <psk:DeviceBitsPerPixel>24</psk:DeviceBitsPerPixel>
      <psk:DriverBitsPerPixel>24</psk:DriverBitsPerPixel>
    </psk:Color>
  </psk:PageOutputColor>

600 ~<SetupInfo>
       <TargetHWID> C700 series</TargetHWID>
      <AvailablePSAList>
601 ~   <PSA>
          <APPID> AUMID1</APPID>
          <Name> FULL-FUNCTION PSA<Name>
          <Explaination>
            ALL FUNCTIONS OF PRINTER CAN BE FULLY USED
          </Explaination>
        </PSA>
        <PSA>
          <APPID> AUMID2</APPID>
          <Name> ECOLOGICAL PSA<Name>
          <Explaination>
            PRINTING CAN BE PERFORMED IN ENVIRONMENT-FRIENDLY WAY SUCH AS PROHIBITING COLOR PRINTING AND ENFORCING DOUBLE-SIDED PRINTING.
          </Explaination>
        </PSA>
      </AvailablePSAList>

</SetupInfo>
</PrintDeviceCapabilities>
```

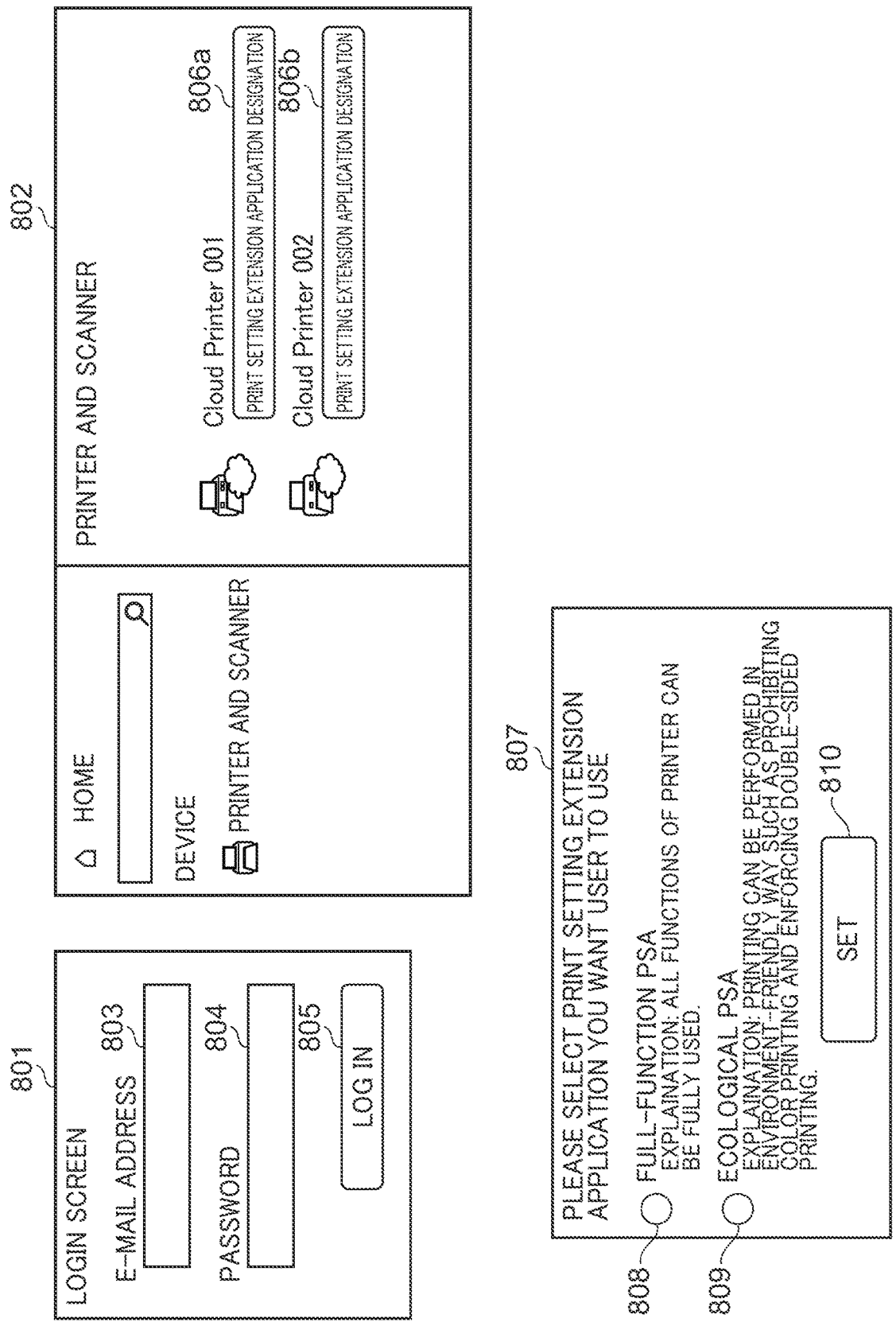

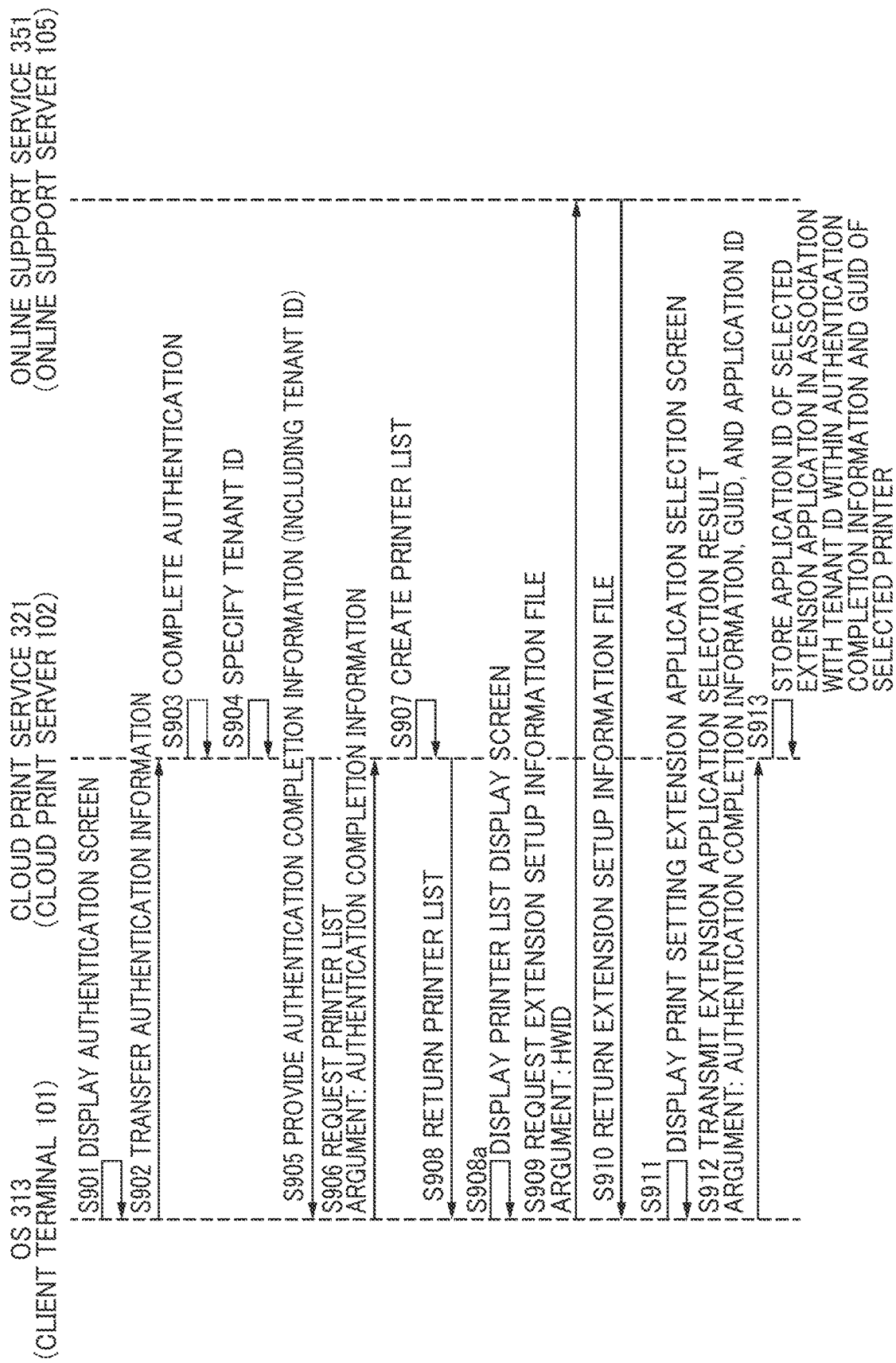

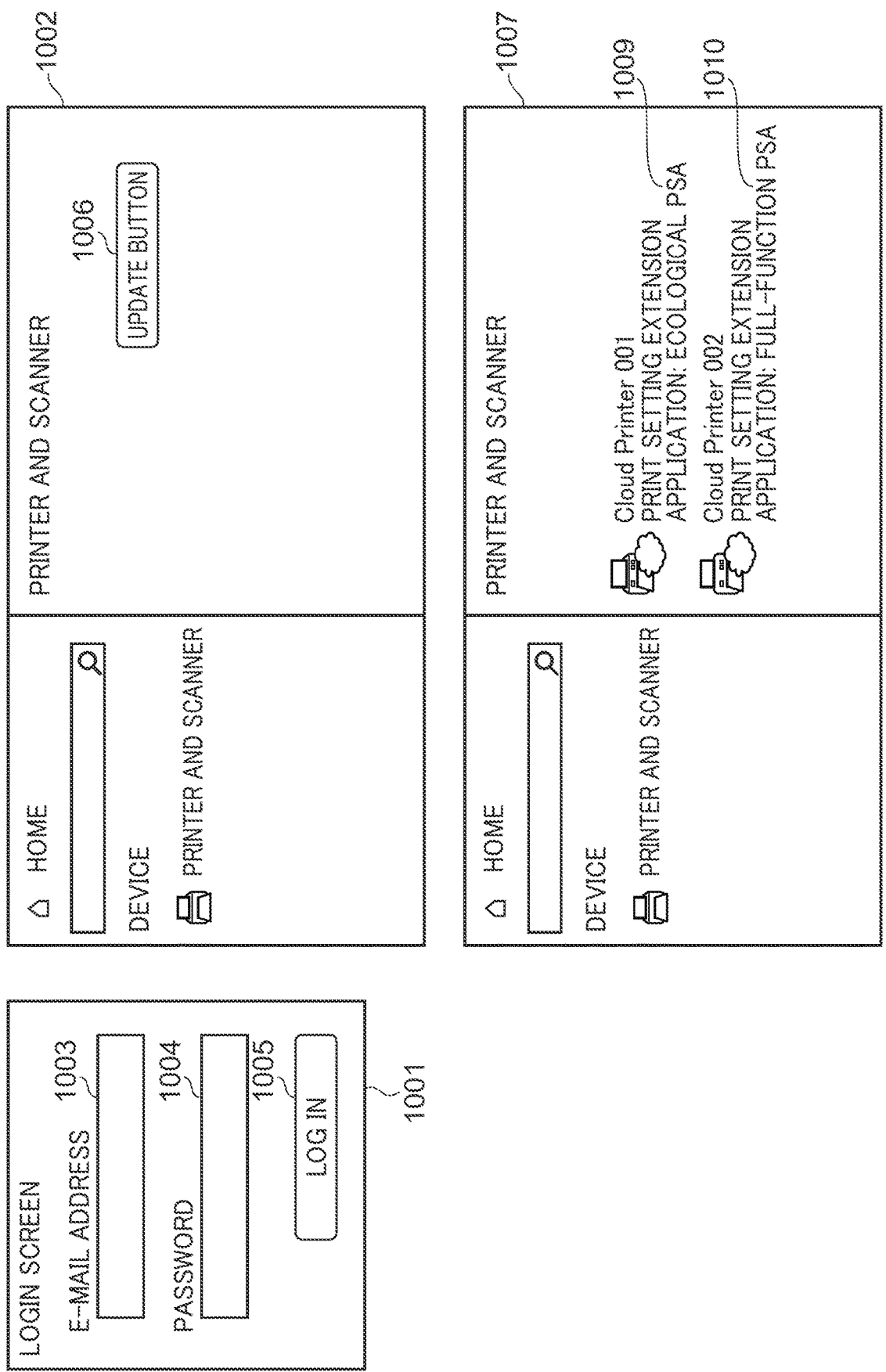

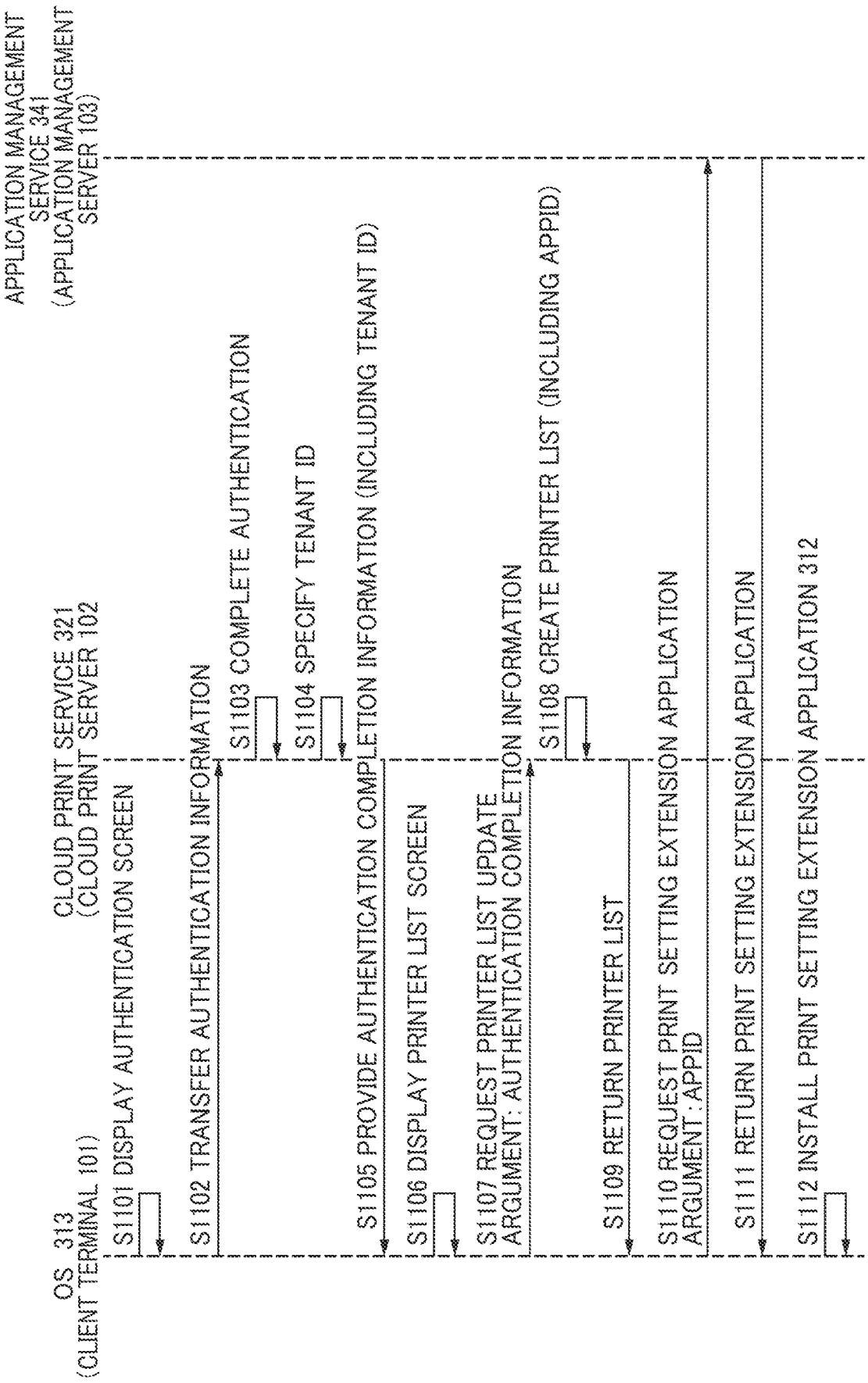

PRINTING SYSTEM ALLOWING ADMINISTRATOR TO CONVENIENTLY LIMIT FUNCTION OF PRINT DEVICE WHEN USED BY GENERAL USER, INFORMATION PROCESSING APPARATUS, CONTROL METHOD, AND STORAGE MEDIUM

BACKGROUND OF THE INVENTION

Field of the Invention

The present invention relates to a printing system, an information processing apparatus, a control method, and a storage medium, and more particularly, to a printing system that increases or decreases the number of functions, which allow to perform print settings by a cloud printer driver, by using an extension application, an information processing apparatus, a control method, and a storage medium.

Description of the Related Art

Hitherto, a general-purpose printer driver that uses an industry standard protocol such as the internet printing protocol (IPP) and can be commonly used for a plurality of print devices is known. The general-purpose printer driver is able to communicate with printers of a plurality of printer vendors. Therefore, a user is able to transmit a print job to the printer without installing a vendor-specific printer driver by using the general-purpose printer driver as a cloud printer driver.

On the other hand, since the general-purpose printer driver handles print jobs printed by printers of various vendors, items and functions that can be set as print settings are limited. Therefore, in Japanese Laid-Open Patent Publication (kokai) No. 2020-04158, an extension application, which is provided by a vendor and is associated with identification information of a printer designated by a user, is installed in a client personal computer (PC), and a function of a general-purpose printer driver used as a cloud printer driver is extended. As a result, a vendor-specific print setting user interface (UI) and a print job editing function are implemented.

However, since the identification information of the printer is set for each model or type of the printer, in the case that there is a plurality of printers of the same model, only the same extension application can be associated with all the printers.

In addition, with the extension application according to the related art, all functions of the printer can be used so that the functions of the printer of the associated model can be maximized. However, in the case that the printer is lent to an employee in a company, such a situation may not be desirable.

For example, it is assumed that a double-sided printing function of performing printing on both a back side and a front side of a printing sheet (a paper sheet) is added to the cloud printer driver by the extension application in addition to a single-sided printing function of performing printing only on the front side of the printing sheet, the single-sided printing function being provided by the general-purpose printer driver. In this case, since the double-sided printing consumes less printing sheets, the company may desire that the employee does not use the single-sided printing function.

In addition, it is assumed that a function of implementing clearer printing is added to the cloud printer driver by the extension application in addition to a color printing function provided by the general-purpose printer driver. In this case, a better printed matter can be obtained, but the amount of ink consumed also increases, and thus, the company may desire to prevent the employee from using the added function. Furthermore, in order to reduce the amount of ink consumed and reduce the cost, the company may desire to make the color printing function originally existing in the general-purpose printer driver unavailable to the employee in the cloud printer driver, and make only a monochrome printing function available.

These are intended to limit the function of the printer, and there is a limit in individually instructing employees to use the printer as described above, and these are not thoroughly implemented unless an administrator of the company forces the employees to do so.

SUMMARY OF THE INVENTION

The present invention provides a printing system allowing an administrator to conveniently limit a function of a print device when used by a general user, an information processing apparatus, a control method, and a storage medium.

Accordingly, the present invention provides a printing system comprising a print device, an information processing apparatus in which a general-purpose printer driver commonly usable for a plurality of models of print devices is initially set as a cloud printer driver used when printing is performed by the print device, a first server, and a second server. The printing system increases or decreases the number of functions settable by a general user by using the cloud printer driver by installing a print setting extension application in the information processing apparatus. The first server manages an APPID of the print setting extension application to be installed when the general user uses the print device as print setting extension application designation information in association with a GUID which is an identifier indicating an individual of the print device. The second server manages a plurality of print setting extension applications in association with their APPIDs. The information processing apparatus comprises a change request module configured to request, when an administrator logs in, the first server to change the print setting extension application designation information according to an operation by the administrator, and an information request module configured to request, when the general user logs in, the first server to provide the print setting extension application designation information according to an operation by the general user. The first server comprises a change module configured to change the print setting extension application designation information to be managed in response to the received request made by the change request module, and an application designation information return module configured to return the print setting extension application designation information to the information processing apparatus in response to the received request made by the information request module. The information processing apparatus further comprises an application request module configured to request the second server to provide the print setting extension application based on the print setting extension application designation information returned from the first server. The second server comprises an application return module configured to return the print setting extension application to the information processing apparatus in response to the received request made by the application request module. The information processing apparatus further comprises an installation module configured to install the print setting extension application returned from the second server.

Accordingly, the present invention provides an information processing apparatus which is provided in a printing system comprising a print device, a first server configured to manage an APPID of a print setting extension application to be installed when a general user uses the print device as print setting extension application designation information in association with a GUID that is an identifier indicating an individual of the print device, and a second server configured to manage a plurality of print setting extension applications in association with their APPIDs, in which a general-purpose printer driver commonly usable for a plurality of models of print devices is initially set as a cloud printer driver used when printing is performed by the print device, and which increases or decreases the number of functions settable by the general user by using the cloud printer driver when the print setting extension application is installed, the information processing apparatus comprising an application designation information change module configured to request, when an administrator logs in, the first server to change the print setting extension application designation information according to an operation by the administrator, and change the print setting extension application designation information managed by the first server, an information acquisition module configured to request, when the general user logs in, the first server to provide the print setting extension application designation information according to an operation by the general user, and acquire the print setting extension application designation information from the first server, an application acquisition module configured to request the second server to provide the print setting extension application based on the acquired print setting extension application designation information, and acquire the print setting extension application from the second server, and an installation module configured to install the print setting extension application returned from the second server.

According to the present invention, it is possible for the administrator to conveniently limit the function of the print device when used by the general user.

Further features of the present invention will become apparent from the following description of exemplary embodiments with reference to the attached drawings.

BRIEF DESCRIPTION OF THE DRAWINGS

FIG. 3 is a diagram showing user management information stored in the cloud print server.

FIG. 6 is a diagram showing an extension setup information file stored in the online support server.

FIG. 8 is a diagram showing a flow of a screen operation when an "administrator" designates the print setting extension application to be used by a "general user" who is a subordinate of the "administrator" in an organization indicated by a tenant ID in the user management information of FIG. 3.

FIG. 9 is a sequence diagram of a processing executed in the printing system when the administrator performs the screen operation of FIG. 8.

FIG. 10 is a diagram for describing a flow of a screen operation performed by the general user to use the cloud print compatible printer in the client terminal after the screen operation of FIG. 8 is performed by the administrator.

FIG. 11 is a sequence diagram of a processing executed in the printing system when the general user performs the screen operation of FIG. 10.

DESCRIPTION OF THE EMBODIMENTS

The present invention will now be described in detail below with reference to the accompanying drawings showing embodiments thereof.

Hereinafter, embodiments of the present invention will be described in detail. It should be noted that components described in the embodiments are merely examples of the present invention, and the scope of the present invention is not limited thereto.

Hereinafter, an embodiment of the present invention will be described with reference to the drawings.

Figure 1:
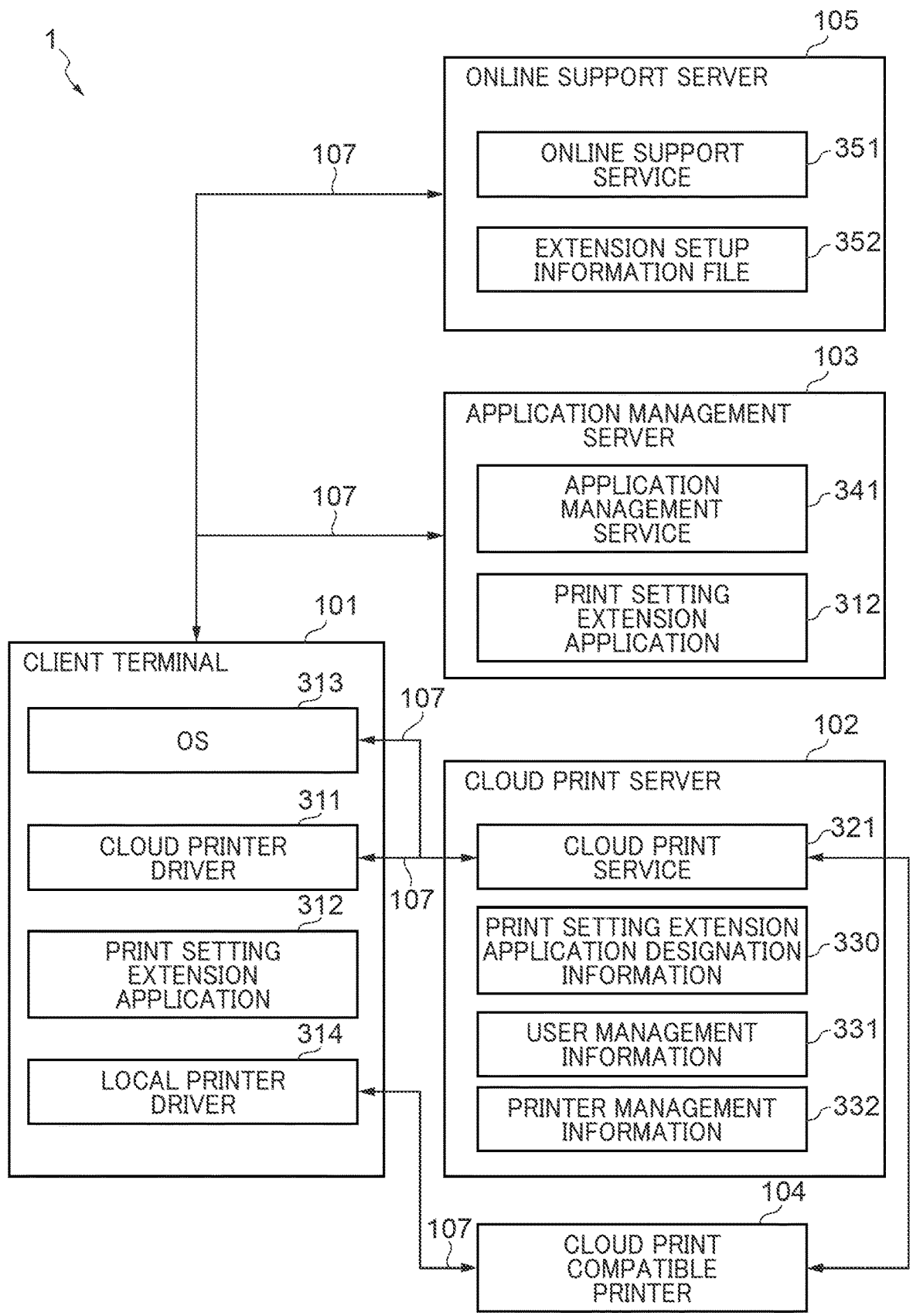
FIG. 1 is a schematic diagram showing a hardware configuration of a printing system including a client terminal as an information processing apparatus according to an embodiment of the present invention.

FIG. 1 is a schematic diagram showing a hardware configuration of a printing system 1 including a client terminal 101 as an information processing apparatus according to the present embodiment.

In the printing system 1 of FIG. 1, the client terminal 101, a cloud print server 102, an application management server 103, a cloud print compatible printer 104, and an online support server 105 are connected via a network 107.

It should be noted that FIG. 1 shows a case that one client terminal 101 is included in the printing system 1, but the present invention is not limited thereto. For example, a plurality of client terminals 101 may be provided in the printing system 1. In addition, in FIG. 1, one printer is shown as the cloud print compatible printer 104, but actually, two or more printers exist in the printing system 1 as the cloud print compatible printers 104. These two or more printers may be the same or different in model, and are each assigned an individual identification number indicating an individual of a printer to be described below.

In addition, the cloud print server 102, the application management server 103, and the online support server 105 may be a server system including a plurality of information processing apparatuses. As a result, a load on each of the cloud print server 102, the application management server 103, and the online support server 105 is able to be distributed to the plurality of information processing apparatuses.

Furthermore, the cloud print server 102, the application management server 103, and the online support server 105 may be physically configured by one information processing apparatus so as to virtually exist inside the one information processing apparatus.

In the present embodiment, it is assumed that the network 107 is a wide area network (WAN) such as the Internet for connection to a cloud service, but all may be a closed environment such as a local area network (LAN) within a company.

The online support server 105 (a fourth server) is a server device that provides an online support service 351, and holds an extension setup information file 352. The online support service 351 is a service that provides the extension setup information file 352 to the client terminal 101. Further, the extension setup information file 352 describes information for extending a function of the client terminal 101 and information on at least one print setting extension application 312 that implements the extension.

The client terminal 101 is an information processing apparatus such as a PC, a tablet, or a smartphone, and is a terminal directly operated by a user. Arbitrary application software including an operating system (OS) 313, a cloud printer driver 311, a local printer driver 314, and the print setting extension application 312 can be executed on the client terminal 101.

The OS 313 manages all software on the client terminal 101, and is an operating system that performs installation and management of the local printer driver 314, the cloud printer driver 311, and the print setting extension application 312. At this time, as print setting extension application designation information 330 is acquired from the cloud print server 102, the print setting extension application 312 designated by the print setting extension application designation information 330 can be installed.

The cloud printer driver 311 is a general-purpose printer driver that uses an industry standard protocol (the internet printing protocol (IPP) in the present embodiment) and can be used in common for a plurality of models of print devices from a plurality of vendors. The function of the cloud printer driver 311 can be extended by installing the print setting extension application 312 by a method described below with reference to FIGS. 10 and 11.

The cloud print compatible printer 104 (a print device) is a device that actually performs printing on a recording medium such as a paper sheet, and is an image forming apparatus that converts print data received via the network 107 into image data and performs printing of the image data.

Not only the cloud print compatible printer 104 can receive the print data from the client terminal 101 via the cloud print server 102, but also the cloud print compatible printer 104 can directly receive the print data from the client terminal 101 without going through the cloud print server 102.

The cloud print compatible printer 104 receives the print data generated by the cloud printer driver 311 of the client terminal 101 via the cloud print server 102.

Furthermore, the cloud print compatible printer 104 receives the print data generated by the local printer driver 314 of the client terminal 101 without going through the cloud print server 102.

The cloud print server 102 is a server device that receives a print instruction and the print data from the outside and provides the cloud print service 321. The cloud print server 102 (functioning as not only a first server but also a third server) holds the print setting extension application designation information 330, user management information 331, and printer management information 332.

The cloud print service 321 transmits the print data received from the client terminal 101 to the cloud print compatible printer 104. Further, the cloud print service 321 provides the print setting extension application designation information 330 to the client terminal 101 in response to a request from the OS 313 of the client terminal 101. In addition, the cloud print service 321 manages the user who uses the client terminal 101 by using the user management information 331 according to information from the OS 313 of the client terminal 101. The cloud print service 321 also uses the printer management information 332 to manage the cloud print compatible printer 104 available to the user managed using the user management information 331.

The application management server 103 (function as a second server) is a server device that provides an application management service 341, and holds and manages various applications including the print setting extension application 312 in association with their APPIDs which are identifiers indicating the respective applications. When the application management service 341 receives a download request of the print setting extension application 312 from the client terminal 101, the application management service 341 transmits the print setting extension application 312 to the client terminal 101.

Figure 2A:
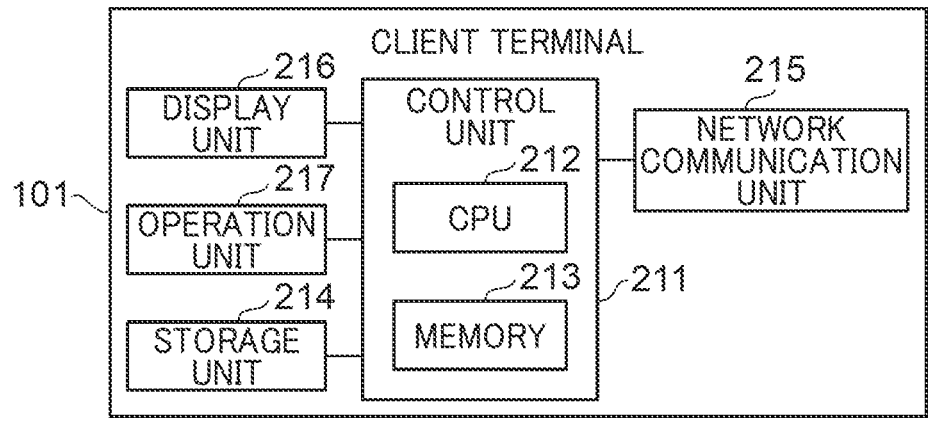
FIGS. 2A, 2B, 2C, 2D and 2E are block diagrams showing respective hardware configurations of the client terminal, a cloud print server, an application management server, a cloud print compatible printer, and an online support server that are included in the printing system.

FIG. 2A is a block diagram showing a hardware configuration of the client terminal 101.

The client terminal 101 includes a display unit 216, an operation unit 217, a storage unit 214, a control unit 211, and a network communication unit 215.

The storage unit 214 is a nonvolatile storage device such as a hard disk drive (HDD) or a solid state drive (SSD), and can store and rewrite digital data.

The control unit 211 includes a central processing unit (CPU) 212 and a memory 213, and controls the entire operation of the client terminal 101. The CPU 212 loads a program stored in the storage unit 214 into the memory 213 and executes the program. The memory 213 is a main storage memory of the CPU 212 and is used as a working area and a temporary storage area for loading various programs.

The network communication unit 215 is a device that communicates with an external device via the network 107 and inputs and outputs the digital data. In the present embodiment, examples of the external device include the cloud print server 102, the application management server 103, the cloud print compatible printer 104, the online support server 105, and other client terminals.

The display unit 216 is a device for displaying visual information to the user, such as a liquid crystal display. The operation unit 217 is a device for receiving an input from the user by a keyboard, a mouse, or the like. The client terminal 101 may include a device having both functions of the display unit 216 and the operation unit 217, such as a touch panel, instead of the display unit 216 and the operation unit 217.

Figure 2B:
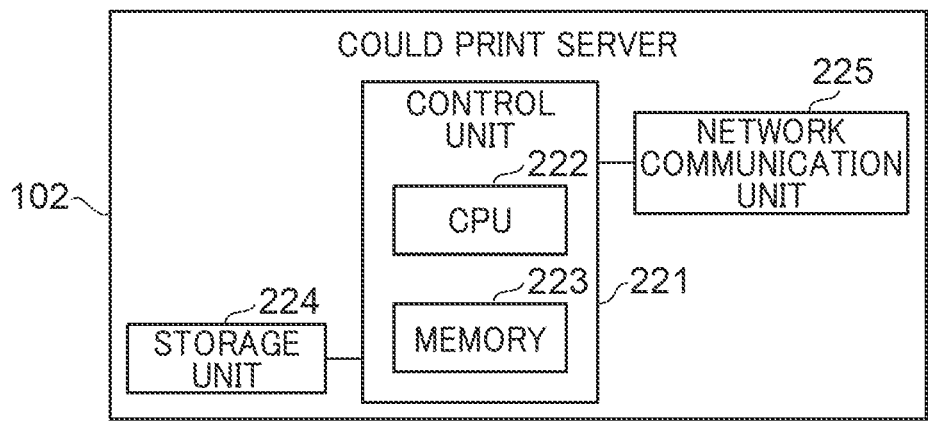

FIG. 2B is a block diagram showing a hardware configuration of the cloud print server 102.

The cloud print server 102 includes a storage unit 224, a control unit 221, and a network communication unit 225.

The storage unit 224 is a nonvolatile storage device such as an HDD or an SSD. The storage unit 224 stores the print setting extension application designation information 330, the user management information 331, and the printer management information 332.

Since the control unit 221 and the network communication unit 225 have functions equivalent to those of the control unit 211 and the network communication unit 215 of the client terminal 101, respectively, descriptions thereof are omitted.

It should be noted that, although the cloud print server 102 is described as being implemented by one information processing apparatus having the hardware configuration shown in FIG. 2B, the cloud print server 102 may also be implemented by a plurality of information processing apparatuses.

Figure 2C:
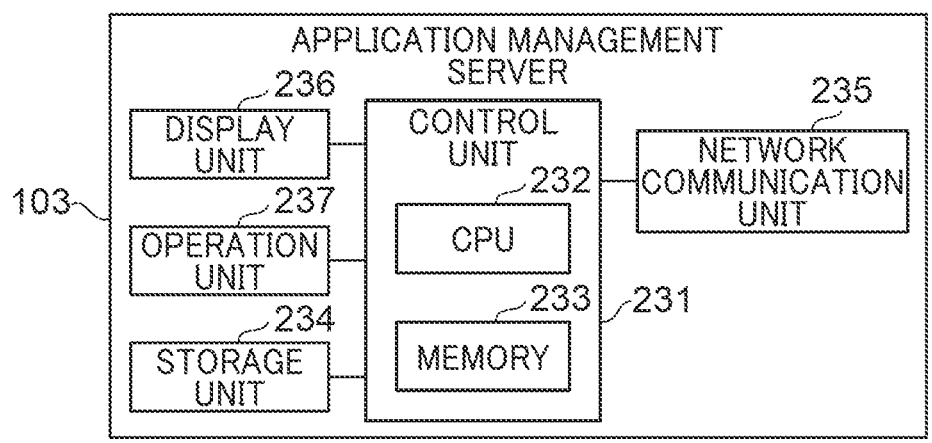

FIG. 2C is a block diagram showing a hardware configuration of the application management server 103.

The application management server 103 includes a display unit 236, an operation unit 237, a storage unit 234, a control unit 231, and a network communication unit 235.

The storage unit 234 is a nonvolatile storage device such as an HDD or an SSD. The storage unit 234 stores the print setting extension application 312.

Since the display unit 236, the operation unit 237, the storage unit 234, the control unit 231, and the network communication unit 235 have functions equivalent to those of the display unit 216, the operation unit 217, the control unit 211, and the network communication unit 215 of the client terminal 101, respectively, descriptions thereof are omitted.

It should be noted that, although the application management server 103 is described as being implemented by one information processing apparatus having the hardware configuration shown in FIG. 2C, the application management server 103 may also be implemented by a plurality of information processing apparatuses.

Figure 2D:
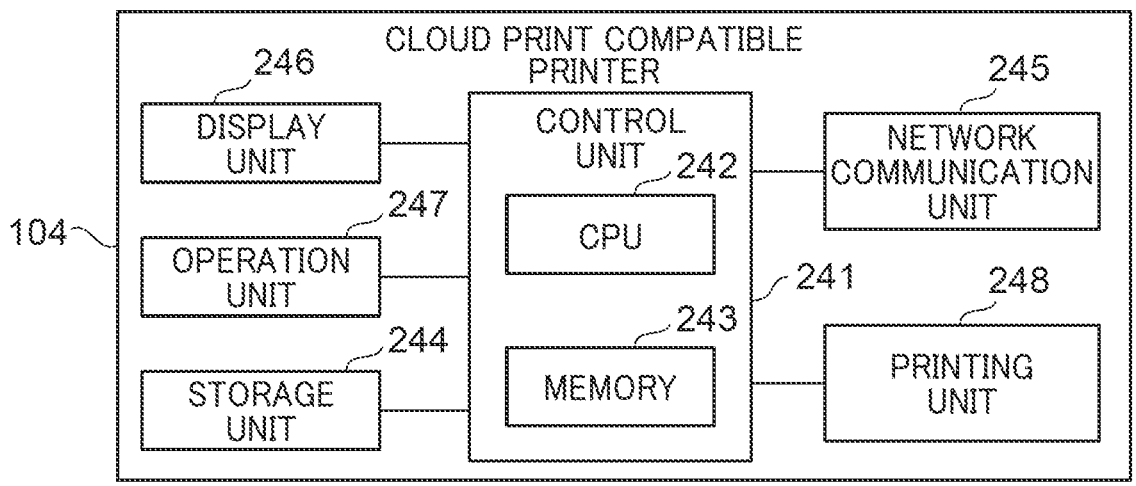

FIG. 2D is a block diagram showing a hardware configuration of the cloud print compatible printer 104.

The cloud print compatible printer 104 includes a display unit 246, an operation unit 247, a storage unit 244, a control unit 241, a network communication unit 245, and a printing unit 248.

The display unit 246 is a device for displaying information to the user and includes a touch panel display, an LED, or the like provided in the cloud print compatible printer 104.

The operation unit 247 is a device for receiving an input from the user and includes a touch panel display in which the display unit 246 and the operation unit 247 are integrally configured. It should be noted that the operation unit 247 may include a hard key such as a numeric keypad in addition to the touch panel display. Since the storage unit 244 and the control unit 241 have functions equivalent to those of the storage unit 214 and the control unit 211 of the client terminal 101, respectively, descriptions thereof are omitted.

The network communication unit 245 is a device that communicates with the external network 107, and mainly serves to receive print data and transmit information indicating a state of the cloud print compatible printer 104 such as an error to an external server or the like.

The printing unit 248 is a device that executes a printing processing by performing a series of operations including paper feeding, printing, and paper discharge for paper sheets prepared in a cassette or a tray. A printing method for the printing unit 248 may be an electrophotographic method or an inkjet method, and is not particularly limited. The printing unit 248 also includes a double-sided unit used at the time of the paper discharge, and a finishing device for stapling, punching, or the like.

It should be noted that, in the present embodiment, a case that the cloud print compatible printer 104 is a single function printer that performs only a printing function has been described. However, the cloud print compatible printer 104 may also be a multi-function printer (a multi-function peripheral) that also has a scanner function and a FAX function.

Figure 2E:
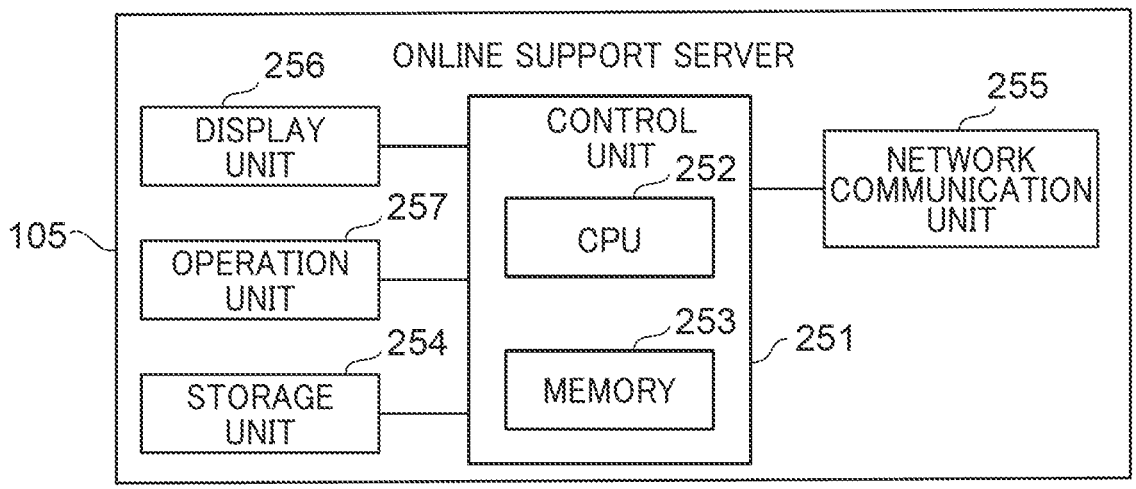

FIG. 2E is a hardware block diagram showing details of the online support server 105.

The online support server 105 includes a display unit 256, an operation unit 257, a storage unit 254, a control unit 251, and a network communication unit 255.

Since the display unit 256 and the operation unit 257 have functions equivalent to those of the display unit 216 and the operation unit 217 of the client terminal 101, respectively, descriptions thereof are omitted.

The storage unit 254 is a nonvolatile storage device such as an HDD or an SSD. The storage unit 254 stores the extension setup information file 352 which is a file in which information for extending the function provided by the client terminal 101 is described.

The control unit 251 includes a CPU 252 and a memory 253. The CPU 252 controls the entire online support server 105. The memory 253 is used for a processing executed by the CPU 252. The network communication unit 255 is an interface for the online support server 105 to communicate with the client terminal 101. The online support server 105 receives an acquisition request for a file stored in the storage unit 254 via the network communication unit 255, and transmits the corresponding file to the client terminal 101.

In the present embodiment, the online support server 105 is described as being implemented by one information processing apparatus, but the online support server 105 may also be implemented by a plurality of information processing apparatuses.

FIG. 3 is a diagram showing the user management information 331 stored in the cloud print server 102.

As shown in FIG. 3, the user management information 331 includes information of a tenant ID 331*a*, a role 331*b*, an account ID 331*c*, and a password 331*d*.

The tenant ID 331*a* is information indicating an organization such as a company or a school to which the user belongs. The same tenant ID 331*a* indicates belonging to the same organization.

The role 331*b* indicates the role of the user in the organization. In the case that the role of the user is "administrator", the user has authority to manage other users of the same organization. In the case that the role of the user is "general user", the user is on a managed side as a general user who is not authorized as the administrator.

In addition, as authentication information for specifying the user, the account ID 331*c* which is a unique identifier (an e-mail address) for each user and the password 331*d* are stored in the user management information 331 in association with each other.

Figure 4:
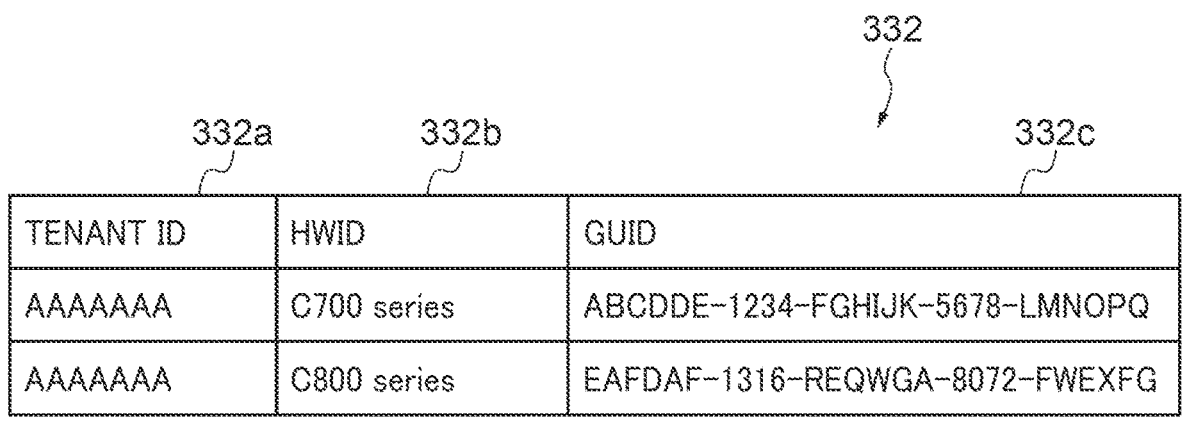
FIG. 4 is a diagram showing printer management information stored in the cloud print server.

FIG. 4 is a diagram showing the printer management information 332 stored in the cloud print server 102.

As shown in FIG. 4, the printer management information 332 includes information of a tenant ID 332*a*, an HWID 332*b*, and a GUID 332*c*.

These pieces of information stored in the printer management information 332 are used to manage the function of the cloud print compatible printer 104 available to the user managed using the user management information 331.

The tenant ID 332*a* is information indicating an organization such as a company or a school that owns the cloud print compatible printer 104. In the case that the value of the tenant ID 332*a* is the same as the value of the tenant ID 331*a* associated with the user managed using the user management information 331, the user can use the printer associated with the tenant ID 332*a*.

The HWID 332*b* is information indicating the model of the printer associated with the tenant ID 332*a*. The GUID 332*c* is an individual identification number indicating an individual of the printer associated with the tenant ID 332*a*.

Figure 5:
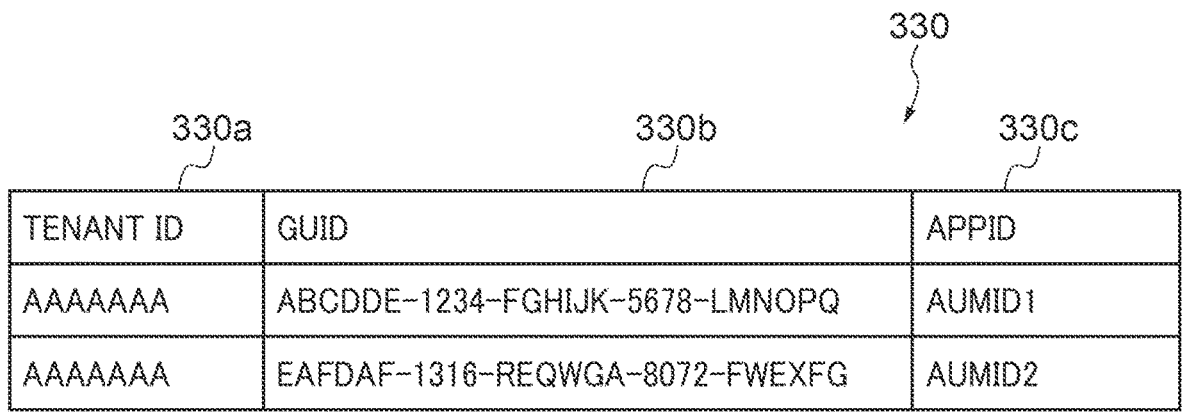
FIG. 5 is a diagram showing print setting extension application designation information stored in the cloud print server.

FIG. 5 is a diagram showing the print setting extension application designation information 330 stored in the cloud print server 102.

As shown in FIG. 5, the print setting extension application designation information 330 includes information of a tenant ID 330*a*, a GUID 330*b*, and an APPID 330*c*.

These pieces of information stored in the print setting extension application designation information 330 are used to define which print setting extension application 312 is to be used for each printer model in an organization having a plurality of cloud print compatible printers 104.

The tenant ID 330a is information indicating an organization such as a company or a school that owns the cloud print compatible printer 104.

The GUID 330b is an identifier indicating the model of the printer associated with the tenant ID 330a. The APPID 330c is an identifier indicating the print setting extension application 312 associated with the GUID 330b.

FIG. 6 is a diagram showing the extension setup information file 352 stored in the online support server 105.

The extension setup information file 352 is a file created by a vendor of the cloud print compatible printer 104 and stored in the online support server 105. The extension setup information file 352 includes an item 600 of "TargetHWID" and an item 601 of "AvailablePSAList".

In the item 600, information (HWID) indicating the model of the cloud print compatible printer 104 targeted by the extension setup information file 352 is described.

In the item 601, a plurality of names and identifiers (hereinafter, referred to as APPIDs) indicating the print setting extension applications 312 to be used for setting print data to be transmitted to the target cloud print compatible printer 104 can be described. In the present embodiment, the names and the APPIDs indicating two print setting extension applications 312 are described in the item 601. "Full-function PSA" is the name of one print setting extension application 312, and "AUMID1" indicates the APPID of the one print setting extension application 312. Furthermore, "Ecological-PSA" is the name of the other print setting extension application 312, and "AUMID2" indicates the APPID of the other print setting extension application 312.

Figure 7:
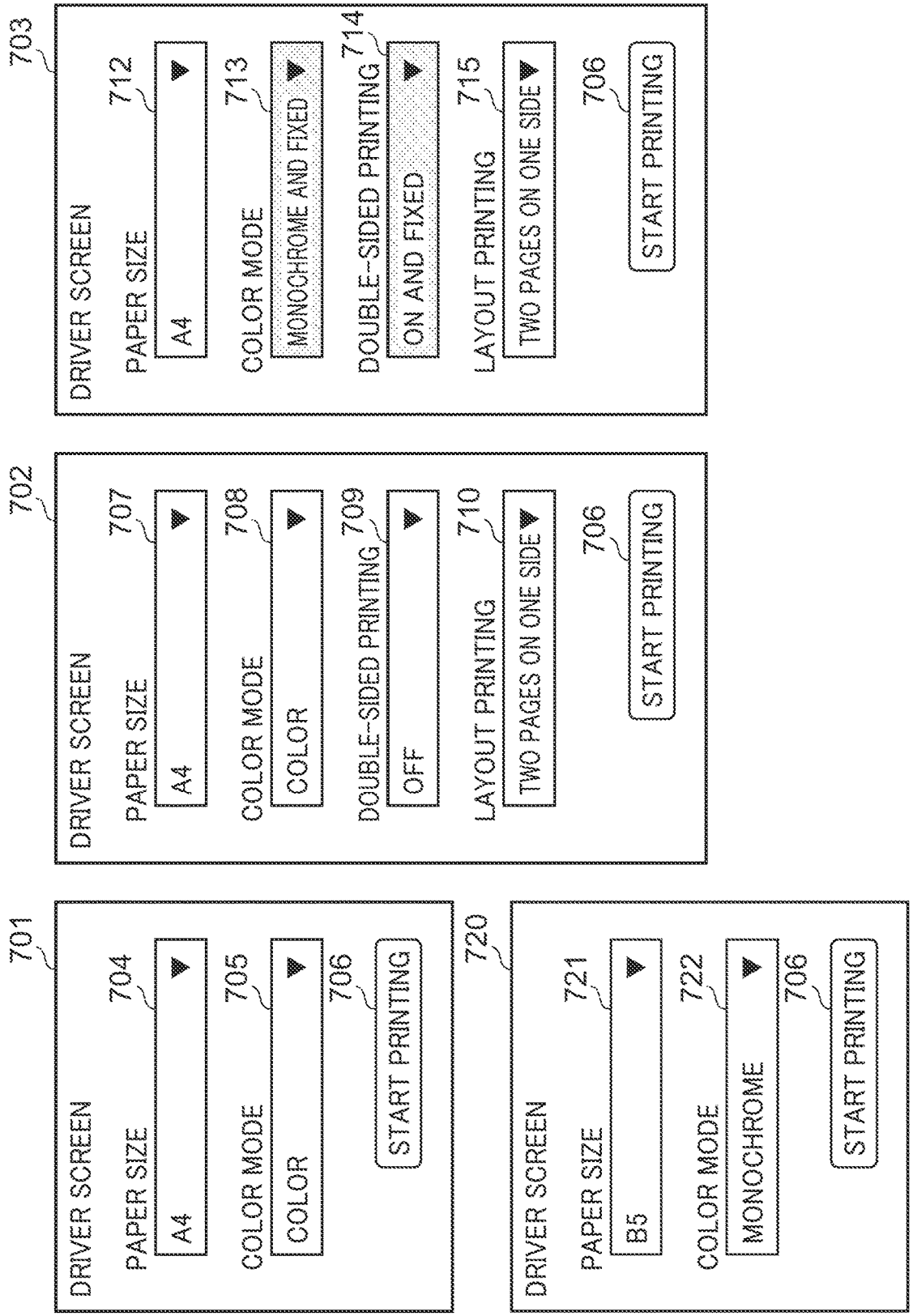
FIG. 7 is a diagram showing screen examples of a cloud printer driver before and after installation of a print setting extension application.

FIG. 7 is a diagram showing screen examples of the cloud printer driver 311 before and after installation of the print setting extension application 312. These can be displayed by a touch panel display integrally configured by the display unit 216 and the operation unit 217 of the client terminal 101.

A screen 701 is an example of a general-purpose print setting screen displayed before installation of the print setting extension application 312. As described above, before the print setting extension application 312 is installed on the client terminal 101, the print setting screen provided by an operating system (hereinafter, referred to as an OS) installed on the client terminal 101 is displayed. The print setting screen provided by the OS has fewer setting items than the print setting screen provided by the print setting extension application.

In a print setting item 704, the user can select a paper size at the time of printing, and in this example, A4 is selected. In a print setting item 705, the user can select a color mode. For example, in the case that "color" is selected by the user as shown in the screen 701, multicolor printing using color ink is performed at the time of printing. A button 706 is a print button, and when the user presses the button 706, the CPU 212 instructs the cloud print compatible printer 104 to perform printing based on the settings designated in the print setting items 704 and 705.

A screen 720 is a screen example in the case that the user changes the print setting on the print setting screen provided by the OS shown in the screen 701. A print setting item 721 indicates that the user has changed the paper size from A4 to B5, and a print setting item 722 indicates that the color mode is changed from "color" to "monochrome". Here, in the case that "monochrome" is selected by the user as shown in the screen 720, printing using only black ink is performed without using color ink. In the case that the color mode is "monochrome", fewer types of ink are used, and thus, printing at a lower price becomes possible as compared to a case that the color mode is "color".

A screen 702 is an example of a print setting screen of the cloud printer driver 311 extended by installation of the print setting extension application 312 of "Full-function PSA" with the APPID "AUMID 1" shown in FIG. 6.

Similarly to the general-purpose print setting screen provided by the OS, the screen 702 includes a print setting item 707 that allows the user to select the paper size at the time of printing, a print setting item 708 that allows the user to select the color mode, and the button 706. Furthermore, the screen 702 includes print setting items 709 and 710 on the print setting screen displayed by the print setting extension application 312.

In the print setting item 709, the user can select whether to perform double-sided printing for printing on both of the front and back surfaces of the paper sheet or single-sided printing for printing only on the front surface. For example, in the case that "OFF" is selected by the user as shown in the print setting item 709, single-sided printing is performed at the time of printing. In the print setting item 710, the user can set layout printing (multi-page printing) for printing the contents of a plurality of pages on a side of one paper sheet. For example, in the case that "two pages on one side" is selected by the user as shown in the print setting item 710, two pages are printed on one side at the time of printing. As a result, it is possible to save paper sheets as compared to a case that one page is printed on one side. Furthermore, since one page is printed small in order to print a plurality of pages on one side, there is also an effect of reducing the amount of ink consumed.

A screen 703 is a screen example of the cloud printer driver 311 extended by installation of the print setting extension application 312 of "Ecological-PSA" with the APPID "AUMID2" shown in FIG. 6.

The screen 703 includes print setting items 712 to 715 corresponding to the print setting items 707 to 710 in addition to the button 706.

Similarly to the screen 702, the user can also select the paper size at the time of printing on the screen 703 by using the print setting item 712 for designating the paper size.

However, the print setting item 713 for designating the color mode is fixed to "monochrome", and cannot be changed to "color". Thus, the amount of ink consumed can be reduced.

Further, in the print setting item 714 for designating one of the double-sided printing and the single-sided printing, the setting is fixed to the double-sided printing, and cannot be changed to the single-sided printing. As a result, the contents of two pages can be printed on one paper sheet, and the consumption of paper sheets can be reduced. In the print setting item 715 for setting the multi-page printing, the default setting is setting for printing two pages on one side. Thus, the amounts of ink and paper sheets consumed can be reduced. It is a matter of course that the user can set the multi-page printing for further saving, such as printing four pages on one side.

As described above, among the print setting items, there are settings that can save paper sheets and ink. In the print setting extension application 312 of "Full-function PSA" with the APPID of "AUMID 1", the user can freely set such setting items at his/her discretion. On the other hand, in the print setting extension application 312 of "Ecological-PSA"

with the APPID of "AUMID2", settable print items are limited as compared with the print setting extension application 312 of "Full-Function PSA".

FIG. 8 is a diagram for describing a flow of a screen operation when the "administrator" designates the print setting extension application to be used by the "general user" who is a subordinate of the "administrator" in the organization indicated by the tenant ID 331a of the user management information 331. Hereinafter, the "administrator" in the organization indicated by the tenant ID 331a of the user management information 331 is simply referred to as an administrator, and the "general user" in the same organization is simply referred to as a general user.

An authentication screen 801, a printer list display screen 802, and a print setting extension application selection screen 807 shown in FIG. 8 are screens displayed on the client terminal 101, and the CPU 212 senses a result of operating the operation unit 217 by the administrator as the user, and switches the display of the screen. At this time, contents to be displayed are obtained and displayed by communicating with the cloud print server 102 and the online support server 105 through the network 107.

The authentication screen 801 is a screen for specifying the user, and when the administrator inputs an e-mail address in an input unit 803, inputs a password in an input unit 804, and presses a button 805, these pieces of information are transmitted to the cloud print server 102 as authentication information, and authentication is performed. Thereafter, when the authentication is completed, the printer list display screen 802 is displayed.

On the printer list display screen 802, the names of the individuals of the cloud print compatible printers 104 registered in the organization to which the administrator belongs are listed, and buttons 806a and 806b are displayed beside the corresponding names, respectively. Specifically, the button 806a is a button corresponding to the cloud print compatible printer 104 named "Cloud Printer 001". The button 806b is a button corresponding to the cloud print compatible printer 104 named "Cloud Printer 002". For example, when the administrator presses the button 806a, the print setting extension application selection screen 807 for setting a function available to the general user (forcing the general user) when using "Cloud Printer 001" is displayed.

The print setting extension application selection screen 807 displays a list of the print setting extension applications 312 that can be installed in "Cloud Printer 001" by the general user in a selectable manner using radio buttons 808 and 809. For example, when the administrator selects the radio button 808 and then presses a button 810, the print setting extension application 312 named "Full-function PSA" is installed in the client terminal 101.

The radio button 808 is an option to apply the print setting extension application 312 named "Full-function PSA" that enables free use of all functions of "Cloud Printer 001". In the case that the radio button 808 is selected, the screen 702 is displayed on the display unit 216 when the general user makes print setting for "Cloud Printer 001" on the client terminal.

The radio button 809 is an option to apply the print setting extension application 312 named "Ecological-PSA" that limits the function of "Cloud Printer 001". In the case that the radio button 809 is selected, the screen 703 is displayed on the display unit 216 when the general user makes print setting for "Cloud Printer 001" on the client terminal.

By performing the above screen operation, the administrator can force the general user to perform the print setting in which some functions are limited.

FIG. 9 is a sequence diagram of a processing executed in the printing system 1 when the administrator performs the screen operation of FIG. 8.

This processing is executed by each of the CPUs 212, 222, and 252 of the client terminal 101, the cloud print server 102, and the online support server 105. More specifically, the processing in the client terminal 101 is executed by the CPU 212 using the OS 313. Therefore, an execution subject in the client terminal 101 is hereinafter simply referred to as the OS 313. Similarly, the processing in the cloud print server 102 is executed by the CPU 222 using the cloud print service 321. Therefore, an execution subject in the cloud print server 102 is hereinafter simply referred to as the cloud print service 321. The processing in the online support server 105 is executed by the CPU 252 using the online support service 351. Therefore, an execution subject in the online support server 105 is hereinafter simply referred to as the online support service 351.

The OS 313 displays the authentication screen 801 on the display unit 216 (step S901). Thereafter, when the administrator as the user inputs authentication information such as an e-mail address and a password on the authentication screen 801 by using the operation unit 217, the OS 313 transfers the authentication information to the cloud print service 321 (step S902).

The cloud print service 321 first confirms the transferred authentication information with the user management information 331 and completes the authentication (step S903). Next, the cloud print service 321 specifies the role of the user (the administrator in FIG. 9) and the tenant ID by referring to the user management information 331 (step S904). Thereafter, the cloud print service 321 returns authentication completion information including the specified tenant ID and the like to the OS 313 (step S905).

The OS 313 acquires the role of the user and the tenant ID from the authentication completion information returned from the cloud print service 321 in step S905. Next, in the case that the acquired role of the user is the administrator, the OS 313 requests the cloud print service 321 to provide a printer list by using the acquired tenant ID as an argument (step S906).

The cloud print service 321 creates the printer list in response to the request from the OS 313 in step S906 (step S907). Specifically, the HWID and the GUID of the cloud print compatible printer 104 associated with the tenant ID as the argument are extracted from the printer management information 332, and the printer list in which the HWID and the GUID are described is created.

Thereafter, the cloud print service 321 returns the printer list to the OS 313 (step S908). The OS 313 displays the printer list display screen 802 based on the printer list returned in step S908 (step S908a). In the present embodiment, in the client terminal 101, the name of each of the individuals of the cloud print compatible printers 104 corresponding to the GUIDs is automatically assigned, and the printer name is displayed on the printer list display screen 802. The printer name can be changed to an arbitrary character string by the administrator of the cloud print service 321.

Thereafter, when the administrator presses one of the buttons 806a and 806b on the printer list display screen 802, the OS 313 acquires the HWID and the GUID of the cloud print compatible printer 104 corresponding to the pressed button from the printer list returned in step S908. Next, the OS 313 requests the online support service 351 to provide the extension setup information file 352 by using the acquired HWID as an argument (step S909).

The online support service 351 returns the extension setup information file 352 to the OS 313 in response to the request from the OS 313 in step S909 (step S910).

The OS 313 displays the print setting extension application selection screen 807 based on the content of the extension setup information file 352 returned in step S910 (step S911).

The OS 313 waits for a series of operations in which the administrator selects one of the radio buttons 808 and 809 and then presses the button 810 on the print setting extension application selection screen 807. When the series of operations is detected, the OS 313 acquires the APPID of the print setting extension application 312 corresponding to the selected radio button by referring to the extension setup information file 352. Next, the OS 313 generates authentication completion information including the APPID of the acquired print setting extension application 312, the GUID acquired in step S909, and the tenant ID acquired in step S906. Thereafter, the OS 313 (functioning as not only a change request module but also an application designation information change module) transmits the generated authentication completion information as an extension application selection result to the cloud print service 321 (step S912).

The cloud print service 321 (a change module) stores, in the print setting extension application designation information 330, the tenant ID, the GUID, and the APPID of the print setting extension application 312 in the authentication completion information transmitted from the OS 313 in step S912 (step S913).

In FIG. 9, it has been described that the client terminal 101 acquires the extension setup information file from the online support service 351 in step S909 and displays the print setting extension application selection screen 807 of FIG. 8. When the client terminal 101 notifies the cloud print server 102 that the user has selected one of the buttons 806a and 806b on the printer list display screen 802, the cloud print server 102 may executes the processing described in step S909. In this case, the cloud print server 102 generates screen information of the print setting extension application selection screen 807, and transmits the generated screen information to the client terminal 101.

Thereby, the sequence of FIG. 9 ends.

FIG. 10 is a diagram for describing a flow of a screen operation performed by the general user to use the cloud print compatible printer 104 in the client terminal 101 after the screen operation of FIG. 8 is performed by the administrator.

An authentication screen 1001, a pre-update printer list display screen 1002, and a post-update printer list display screen 1007 shown in FIG. 10 are screens displayed on the client terminal 101. The CPU 212 senses a result of operating the operation unit 217 by the general user, and switches the display of these screens. At this time, contents to be displayed are obtained and displayed by communicating with the cloud print server 102 and the online support server 105 through the network 107.

The authentication screen 1001 is a screen for specifying the user, and is the same screen as the authentication screen 801. When the general user inputs an e-mail address in an input unit 1003, inputs a password in an input unit 1004, and presses a button 1005, these pieces of information are transmitted to the cloud print server 102, and authentication is performed. Thereafter, when the authentication is completed, the pre-update printer list display screen 1002 is displayed.

The pre-update printer list display screen 1002 is a screen displaying a list of printers usable by the general user. In the case that the general user uses the client terminal 101 for the first time, no printer is listed as shown in the pre-update printer list display screen 1002, and an update button 1006 is displayed in such a way as to be selectable by the user. When the user presses the update button 1006, the screen is updated to the post-update printer list display screen 1007. In response to the pressing of the update button 1006, information regarding all the cloud print compatible printers 104 registered in the organization to which the general user belongs is transmitted from the cloud print service 321.

The names of all the cloud print compatible printers 104 registered in the organization to which the general user belongs are listed, and the names of the print setting extension applications 312 installed to use the respective printers are displayed on the post-update printer list display screen 1007.

Specifically, "Cloud Printer 001" and "Cloud Printer 002" are listed on the post-update printer list display screen 1007. In addition, names 1009 and 1010 of the installed print setting extension applications are displayed in the vicinity of the respective printer names listed.

The general user selects the name of the printer for generating a print queue in the client terminal 101 from among the names of the printers listed on the post-update printer list display screen 1007. The OS of the client terminal 101 acquires printer information corresponding to the name of the selected printer from the cloud print server 102, and stores the printer information in association with the cloud printer driver 311. Further, the OS of the client terminal 101 acquires the print setting extension application 312 displayed in association with the name of the selected printer from the application management server 103, and stores the print setting extension application 312 in association with the generated print queue.

By performing the above screen operation, the general user can cause the cloud print compatible printer 104 to perform printing through the cloud printer driver 311 to which the print setting extension application 312 is applied. More specifically, in the case that printing is instructed from a general application, the print queue associated with the cloud printer driver 311 can be selected. The general application is a document creation application, a spreadsheet application, a presentation material creation application, a web browser, or the like. When a predetermined instruction is given after the selection of the print queue, the print setting extension application 312 is activated, and a print setting screen such as the screen 702 or the screen 703 of FIG. 7 is displayed. Print settings made on the screen 702 or the screen 703 of FIG. 7 and image data set are transmitted to the cloud print server 102, and transmitted from the cloud print server 102 to the cloud print compatible printer 104. The cloud print compatible printer 104 processes and outputs the image data received from the cloud print server 102 according to the print settings received from the cloud print server 102.

FIG. 11 is a sequence diagram of processing executed in the printing system 1 when the general user performs the screen operation of FIG. 10.

This processing is executed by each of the CPUs 212, 222, and 232 of the client terminal 101, the cloud print server 102, and the application management server 103. More specifically, the processing in the client terminal 101 is executed by the CPU 212 using the OS 313. Therefore, an execution subject in the client terminal 101 is hereinafter simply referred to as the OS 313. Similarly, the processing in the cloud print server 102 is executed by the CPU 222 using the cloud print service 321. Therefore, an execution subject in the cloud print server 102 is hereinafter simply referred to as the cloud print service 321. In addition, the CPU 232 executes processing in the application management server 103 by using the application management service 341. Therefore, an execution subject in the application management server 103 is hereinafter simply referred to as the application management service 341.

The OS 313 displays the authentication screen 1001 on the display unit 216 (step S1101). Thereafter, when the general user as the user inputs authentication information such as an e-mail address and a password on the authentication screen 1001 by using the operation unit 217, the OS 313 transfers the authentication information to the cloud print service 321 (step S1102).

The cloud print service 321 first confirms the transferred authentication information with the user management information 331 and completes the authentication (step S1103). Next, the cloud print service 321 specifies the role of the user (the general user in FIG. 11) and the tenant ID by referring to the user management information 331 (step S1104). Thereafter, the cloud print service 321 returns authentication completion information including the specified tenant ID and the like to the OS 313 (step S1105).

The OS 313 acquires the role of the user and the tenant ID from the authentication completion information returned from the cloud print service 321 in step S1105. Next, in the case that the acquired role of the user is the general user, the OS 313 displays the pre-update printer list display screen 1002 (step S1106). Thereafter, when the general user presses the update button 1006 on the pre-update printer list display screen 1002, the OS 313 acquires the tenant ID from the returned authentication completion information. Next, the OS 313 (functioning as not only an information request module but also an information acquisition module) requests the cloud print service 321 to provide a printer list by using the acquired tenant ID as an argument (step S1107).

The cloud print service 321 creates the printer list in response to the request from the OS 313 in step S1107 (step S1108). Specifically, the GUID and the APPID of the cloud print compatible printer 104 associated with the tenant ID as the argument are extracted from the print setting extension application designation information 330, and the printer list in which the GUID and the APPID are described is created. Next, the cloud print service 321 (an application designation information return module) returns the created printer list to the OS 313 (step S1109). Upon receiving the printer list, the OS 313 acquires the GUID and the APPID described therein. The OS 313 displays the post-update printer list display screen 1007 of FIG. 10 based on the acquired information. The user selects the name of the printer for generating the print queue on the displayed post-update printer list display screen 1007.

Next, the OS 313 (functioning as not only an application request module but also an application acquisition module) requests the application management server 103 to provide the print setting extension application 312 by using the APPID as an argument (step S1110). That is, in step S1110, the OS 313 transmits an application acquisition request to the application management server 103 by using the APPID of the print setting extension application 312 associated with the print queue selected by the user as an argument.

The application management service 341 (an application return module) returns the print setting extension application 312 requested from the OS 313 in step S1110 to the OS 313 (step S1111).

The OS 313 (an installation module) installs the received print setting extension application 312 in the client terminal 101. As a result, the OS 313 extends the function of the cloud printer driver 311 for using the cloud print compatible printer 104 specified by the GUID associated with the APPID of the installed print setting extension application 312 (step S1112).

It should be noted that, in the present embodiment, when the general user presses the update button 1006 on the pre-update printer list display screen 1002, the processing in and after step S1107 is started. Therefore, the OS 313 acquires the print setting extension application 312 set by the administrator and installs the same in the client terminal 101. However, the operation of pressing the update button 1006 is not essential. For example, it goes without saying that the processing may directly proceed to step S1107 when the general user presses the button 1005 after inputting the authentication information on the authentication screen 1001, and the authentication completion information is thus provided in step S1105.

Thereby, the sequence of FIG. 11 ends.

It should be noted that an example has been described with reference to FIG. 11 in which the print setting extension application corresponding to the printer having the printer name selected by the user is acquired from the application management server 103, but the following processing may be executed after step S1109. The OS 313 determines whether or not the print setting extension application with the APPID corresponding to the printer having the selected printer name has been installed in the client terminal 101. In the case that the print setting extension application corresponding to the printer having the selected printer name has already been installed, the OS 313 stores the print queue generated based on the information acquired from the cloud print server 102 and the APPID of the print setting extension application in association with each other. On the other hand, in the case that it is determined that the print setting extension application corresponding to the printer having the selected printer name has not been installed in the client terminal 101, the OS 313 executes the processing of step S1101 and subsequent steps.

In FIG. 11, after the printer list acquired from the cloud print server 102 is displayed, the print setting extension application corresponding to the printer having the printer name selected by the user is acquired. However, after acquiring the printer list, the OS 313 of the client terminal 101 may generate the print queues for all the printers having the printer names included in the acquired printer list. In this case, the OS 313 acquires the print setting extension application corresponding to each printer for which the print queue has been generated from the application management server 103, and executes processing of storing the print queue and the print setting extension application in association with each other.

According to the present embodiment, the general user simply presses the update button 1006 as necessary after inputting his/her authentication information on the authentication screen 1001 in the client terminal 101, and the print setting extension application 312 set by the administrator is installed in the client terminal 101. Therefore, the general user can conveniently use the cloud print compatible printer 104 by using the cloud printer driver 311 to which the print setting extension application 312 is applied. The administrator can also conveniently limit the print setting item settable by the general user using the cloud printer driver 311 in advance on the print setting extension application selection screen 807. As a result, the administrator can limit the use of the cloud print compatible printer 104, such as reducing the amount of ink and paper sheets consumed when the general user uses the cloud print compatible printer 104, in accordance with the circumstances of each company.

In the present embodiment, a case that the printing system 1 includes two cloud print compatible printers 104 has been described, but the number of printers is not limited thereto as long as the administrator can limit the print setting item (function) settable by the general user using the cloud printer driver 311. In addition, in the case that there is one cloud print compatible printer 104, when the administrator logs in on the authentication screen 801, direct screen switching to the print setting extension application selection screen 807 may be made.

The tenant ID is managed by the cloud print server 102 in the present embodiment in order to support a plurality of organizations, but the tenant ID does not have to be provided as long as the printing system 1 is a system that supports one organization.

It should be noted that the present embodiment can also be implemented by a processing in which a program that implements one or more functions is supplied to a computer of a system or an apparatus via a network or a storage medium, and a system control unit of the system or the apparatus reads and executes the program. The system control unit can include one or a plurality of processors or circuits, and can include a network of a plurality of isolated system control units or a plurality of isolated processors or circuits to read and execute executable instructions.

The processor or the circuit may include a central processing unit (CPU), a micro processing unit (MPU), a graphics processing unit (GPU), an application specific integrated circuit (ASIC), or a field programmable gate array (FPGA). In addition, the processor or circuit may include a digital signal processor (DSP), a data flow processor (DFP), or a neural processing unit (NPU).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-182770, filed on Nov. 15, 2022, which is hereby incorporated by reference herein in its entirety.

What is claimed is:

1. A printing system comprising:
a print device;
an information processing apparatus in which a general-purpose printer driver commonly usable for a plurality of models of print devices is initially set as a cloud printer driver used when printing is performed by the print device;
a first server; and
a second server, and
wherein the printing system increases or decreases the number of functions settable by a general user by using the cloud printer driver by installing a print setting extension application in the information processing apparatus,
the first server manages an APPID of the print setting extension application to be installed when the general user uses the print device as print setting extension application designation information in association with a GUID which is an identifier indicating an individual of the print device,
the second server manages a plurality of print setting extension applications in association with their APPIDs,
the information processing apparatus comprises:
a change request module configured to request, when an administrator logs in, the first server to change the print setting extension application designation information according to an operation by the administrator; and
an information request module configured to request, when the general user logs in, the first server to provide the print setting extension application designation information according to an operation by the general user,
the first server comprises:
a change module configured to change the print setting extension application designation information to be managed in response to the received request made by the change request module; and
an application designation information return module configured to return the print setting extension application designation information to the information processing apparatus in response to the received request made by the information request module,
the information processing apparatus further comprises an application request module configured to request the second server to provide the print setting extension application based on the print setting extension application designation information returned from the first server,
the second server comprises an application return module configured to return the print setting extension application to the information processing apparatus in response to the received request made by the application request module, and the information processing apparatus further comprises an installation module configured to install the print setting extension application returned from the second server.

2. The printing system according to claim 1, further comprising:
a third server configured to manage the GUID of the print device as printer management information in association with an HWID which is an identifier for specifying a model of the print device; and
a fourth server configured to manage extension setup information including names of the plurality of print setting extension applications and the APPIDs which are respective identifiers of the plurality of print setting extension applications in association with the HWID of the print device, and
wherein the change request module
acquires the printer management information from the third server, acquires the extension setup information associated with the HWID managed by the printer management information from the fourth server, and
makes, when the administrator selects one of the plurality of print setting extension applications managed by the extension setup information, a request to change the APPID associated with the GUID of the print device in the print setting extension application designation information to be managed to the APPID of the selected print setting extension application.

3. The printing system according to claim 1, wherein the printing system comprises a plurality of the information processing apparatuses.

4. The printing system according to claim 1, wherein the first server further manages authentication information of each user of two or more users as user management information in association with a role of the each user and a tenant ID for identifying an organization to which the each user belongs, and
when the information processing apparatus receives the authentication information inputted by the user, the information processing apparatus transmits the authentication information to the first server, and requests an authentication processing and specification of the role of the user and the tenant ID.

5. The printing system according to claim 4, wherein the first server manages the print setting extension application designation information in association with the tenant ID.

6. An information processing apparatus
which is provided in a printing system comprising
a print device;
a first server configured to manage an APPID of a print setting extension application to be installed when a general user uses the print device as print setting extension application designation information in association with a GUID that is an identifier indicating an individual of the print device; and
a second server configured to manage a plurality of print setting extension applications in association with their APPIDs,
in which a general-purpose printer driver commonly usable for a plurality of models of print devices is initially set as a cloud printer driver used when printing is performed by the print device, and which increases or decreases the number of functions settable by the general user by using the cloud printer driver when the print setting extension application is installed,
the information processing apparatus comprising:
an application designation information change module configured to request, when an administrator logs in, the first server to change the print setting extension application designation information according to an operation by the administrator, and change the print setting extension application designation information managed by the first server;
an information acquisition module configured to request, when the general user logs in, the first server to provide the print setting extension application designation information according to an operation by the general user, and acquire the print setting extension application designation information from the first server;
an application acquisition module configured to request the second server to provide the print setting extension application based on the acquired print setting extension application designation information, and acquire the print setting extension application from the second server; and
an installation module configured to install the print setting extension application returned from the second server.

7. A control method for a printing system that comprises
a print device;
an information processing apparatus in which a general-purpose printer driver commonly usable for a plurality of models of print devices is initially set as a cloud printer driver used when printing is performed by the print device;
a first server; and
a second server, and
increases or decreases the number of functions settable by a general user by using the cloud printer driver by installing a print setting extension application in the information processing apparatus,
the control method comprising:
a first management step of managing, by the first server, an APPID of the print setting extension application to be installed when the general user uses the print device as print setting extension application designation information in association with a GUID which is an identifier indicating an individual of the print device;
a second management step of managing, by the second server, a plurality of print setting extension applications in association with their APPIDs;
a change request step of requesting, by the information processing apparatus when an administrator logs in, the first server to change the print setting extension application designation information according to an operation by the administrator;
an information request step of requesting, by the information processing apparatus when the general user logs in, the first server to provide the print setting extension application designation information according to an operation by the general user;
a change step of changing, by the first server, the print setting extension application designation information to be managed in response to the received request made in the change request step;
an application designation information returning step of returning, by the first server, the print setting extension application designation information to the information processing apparatus in response to the received request made in the information request step;
an application request step of requesting, by the information processing apparatus, the second server to provide the print setting extension application based on the print setting extension application designation information returned from the first server;
an application returning step of returning, by the second server, the print setting extension application to the information processing apparatus in response to the received request made in the application request step; and
an installation step of installing, by the information processing apparatus, the print setting extension application returned from the second server.

8. A control method for an information processing apparatus
which is provided in a printing system comprising
a print device;
a first server configured to manage an APPID of a print setting extension application to be installed when a general user uses the print device as print setting extension application designation information in association with a GUID that is an identifier indicating an individual of the print device; and
a second server configured to manage a plurality of print setting extension applications in association with their APPIDs,
in which a general-purpose printer driver commonly usable for a plurality of models of print devices is initially set as a cloud printer driver used when printing is performed by the print device, and
which increases or decreases the number of functions settable by the general user by using the cloud printer driver when the print setting extension application is installed,
the control method comprising:
an application designation information change step of requesting, when an administrator logs in, the first server to change the print setting extension application designation information according to an operation by the administrator, and changing the print setting extension application designation information managed by the first server;
an information acquisition step of requesting, when the general user logs in, the first server to provide the print setting extension application designation information according to an operation by the general user, and acquiring the print setting extension application designation information from the first server;
an application acquisition step of requesting the second server to provide the print setting extension application based on the acquired print setting extension application designation information, and acquiring the print setting extension application from the second server; and
an installation step of installing the print setting extension application returned from the second server.

9. A non-transitory computer-readable storage medium storing a program for causing a computer to execute a control method for a printing system that comprises
a print device;
an information processing apparatus in which a general-purpose printer driver commonly usable for a plurality of models of print devices is initially set as a cloud printer driver used when printing is performed by the print device;
a first server; and
a second server, and
increases or decreases the number of functions settable by a general user by using the cloud printer driver by installing a print setting extension application in the information processing apparatus,
the control method comprising:
a first management step of managing, by the first server, an APPID of the print setting extension application to be installed when the general user uses the print device as print setting extension application designation information in association with a GUID which is an identifier indicating an individual of the print device;
a second management step of managing, by the second server, a plurality of print setting extension applications in association with their APPIDs;
a change request step of requesting, by the information processing apparatus when an administrator logs in, the first server to change the print setting extension application designation information according to an operation by the administrator;
an information request step of requesting, by the information processing apparatus when the general user logs in, the first server to provide the print setting extension application designation information according to an operation by the general user;
a change step of changing, by the first server, the print setting extension application designation information to be managed in response to the received request made in the change request step;
an application designation information returning step of returning, by the first server, the print setting extension application designation information to the information processing apparatus in response to the received request made in the information request step;
an application request step of requesting, by the information processing apparatus, the second server to provide the print setting extension application based on the print setting extension application designation information returned from the first server;
an application returning step of returning, by the second server, the print setting extension application to the information processing apparatus in response to the received request made in the application request step; and
an installation step of installing, by the information processing apparatus, the print setting extension application returned from the second server.

10. A non-transitory computer-readable storage medium storing a program for causing a computer to execute a control method for an information processing apparatus
which is provided in a printing system comprising
a print device;
a first server configured to manage an APPID of a print setting extension application to be installed when a general user uses the print device as print setting extension application designation information in association with a GUID that is an identifier indicating an individual of the print device; and
a second server configured to manage a plurality of print setting extension applications in association with their APPIDs,
in which a general-purpose printer driver commonly usable for a plurality of models of print devices is initially set as a cloud printer driver used when printing is performed by the print device, and which increases or decreases the number of functions settable by the general user by using the cloud printer driver when the print setting extension application is installed, the control method comprising:

an application designation information change step of requesting, when an administrator logs in, the first server to change the print setting extension application designation information according to an operation by the administrator, and changing the print setting extension application designation information managed by the first server;

an information acquisition step of requesting, when the general user logs in, the first server to provide the print setting extension application designation information according to an operation by the general user, and acquiring the print setting extension application designation information from the first server;

an application acquisition step of requesting the second server to provide the print setting extension application based on the acquired print setting extension application designation information, and acquiring the print setting extension application from the second server; and an installation step of installing the print setting extension application returned from the second server.

* * * * *